US Patent Office
3,389,137
Patented June 18, 1968

3,389,137
HETEROCYCLIC PHOSPHINE IMIDE
COMPOUNDS AND PREPARATION
William Lindsay Mosby, North Plainfield, and Mary-Louise Vega, Somerville, N.J., assignors to American Cyanamid Company, Stamford, Conn., a corporation of Maine
No Drawing. Filed Aug. 3, 1965, Ser. No. 477,001
6 Claims. (Cl. 260—256.4)

This invention relates to phosphine imides. More particularly, it relates to phosphine imides of nitrogen-containing heterocyclic compounds and to the method for making them. The phosphine imides of this invention have the structure of Formula III and can be obtained by the reaction of a tetrazole of Formula I with a tertiary phosphine of Formula II.

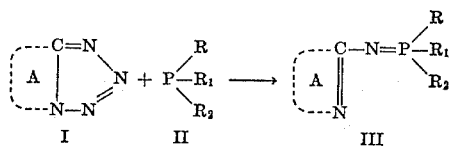

wherein R, $R_1$, and $R_2$ are independently lower alkyl, monocyclic and bicyclic aryl or monocyclic ar(lower alkyl) and A is the residue of a heterocyclic ring system of less than four fused rings, which may be substituted by inert substituents such as lower alkyl, lower alkoxy, monocyclic aryl, halogen (e.g., chloro), hydroxy, nitro, cyano, amino, lower alkanamido (e.g., acetamido), anilino, carboxy, etc.

The reaction of a tetrazole of Formula I with a phosphine (II) to give a phosphine imide (III) is a new reaction.

The tetrazoles of Formula I are characterized as having at least two fused rings, one being the tetrazole ring, and having the carbon atom and one nitrogen atom of the tetrazole ring held in common with the adjacent fused ring. In other word, there are bridge-head carbon and nitrogen atoms.

The tetrazoles may have as many as five, or even more fused rings, including the tetrazole ring. The fused rings, other than the tetrazole ring, i.e. the heterocyclic ring system mentioned above, can contain additional heteroatoms (other than the original bridge-head nitrogen). Such heteroatoms include nitrogen, oxygen, sulfur, selenium, etc. The rings other than the ones containing the above-mentioned bridge-head carbon and nitrogen atoms may be hydrogenated. The tetrazoles include bicyclic, tricyclic and tetracyclic fused ring systems.

The following tetrazole ring systems of Formula I are known. Representative known members of each ring system are named under each ring structure. These are useful in preparing the compounds of this invention. Unless otherwise indicated, the individual compounds are reported in Mosby: Heterocyclic Systems With Bridghead Nitrogen Atoms, 1961, Interscience Publishers, Inc., New York.

(A) Bicyclic Tetrazoles (1) Thiazolo[3,2-d]tetrazole

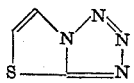

6-methylthiazole[3,2-d]tetrazole
(2) Tetrazolopyridine

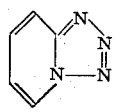

5-methyltetrazolopyridine
5,7-dimethyltetrazolopyridine
6-carboxytetrazolopyridine
8-nitrotetrazolopyridine
8-acetamidotetrazolopyridine
8-aminotetrazolopyridine [1]
(3) Tetrazolo[1,5-b]pyridazine

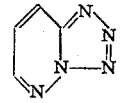

6-methoxytetrazolo[1,5-b]pyridazine
7-methyl-6-methoxytetrazolo[1,5-b]pyridazine
6-chlorotetrazolo[1,5-b]pyridazine
6-chloro-7-methyltetrazolo[1,5-b]pyridazine
(4) Tetrazolo[1,5-c]pyrimidine

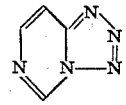

5,8-dimethyl-7-methoxytetrazolo[1,5-c]pyrimidine
7-amino-5-methyltetrazolo[1,5]pyrimidine [2]
(5) Tetrazolo[1,5-a]pyrimidine

Tetra[1,5-a]pyrimidine
5,7-dimethyltetrazolo[1,5-a]pyrimidine
5,6,7,-trimethtyltetrazolo[1,5-a]pyrimidine
5-methyl-7-phenyltetrazolo[1,5-a]pyrimidine
5-hydroxy-7-methyltetrazolo[1,5-a]pyrimidine
5-carboxy-7-methyltetrazolo[1,5-a]pyrimidine
5-methyltetrazolo[1,5-a]pyrimidine
5-methyl-7-methoxytetrazolo[1,5-a]pyrimidine
5-amino-6-cyanotetrazolo[1,5-a]pyrimidine
7-ethoxy-5-methyltetrazolo[1,5-a]pyrimidine
7-chloro-5-methyltetrazolo[1,5-a]pyrimidine (B) Tricyclic-tetrazoles (1) Tetrazolo[5,1-b]benzothiazole

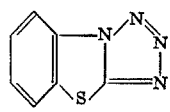

Tetrazolo[5,1-b]benzothiazole
6-nitrotetrazolo-[5,1-b]benzothiazole
6-methyltetrazolo[5,1-b]benzothiazole
6-methoxytetrazolo[5,1-b]benzothiazole
(2) Tetrazolo[5,1-b]benzoselenazole

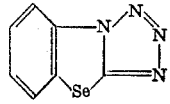

Tetrazolo[5,1-b]benzoselenazole [3]

[1] J. Org. Chem. 25, 458 (1960).
[2] Chem. Pharm. Bull. (Tokyo) 8, 157 (1960); C.A. 55, 4641.
[3] J. Org. Chem., 24 1205 (1959).

(3) 4H-tetrazolo[5,1-a]benzimidazole

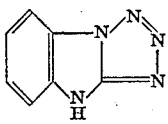

4H-tetrazolo[5,1-a]benzimidazole (4) Tetrazolo[1,5-a]quinoline

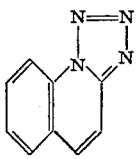

Tetrazolo[1,5-a]quinoline
5-methyltetrazolo[1,5-a]quinoline (5) Tetrazolo[1,5-a][1,8]naphthyridine

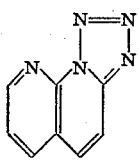

6,8-dimethyltetrazolo[1,5-a][1,8]naphthyridine
6-methyl-8-phenyltetrazole[1,5-a][1,8]naphthyridine (6) Tetrazolo[5,1-a]phthalazine

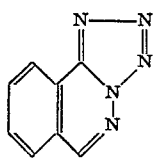

Tetrazolo[5,1-a]phthalazine
6-methoxytetrazolo[5,1-a]phthalazine
6-ethoxytetrazolo[5,1-a]phthalazine
6-chlorotetrazolo[5,1-a]phthalazine
6-aminotetrazolo[5,1-a]phthalazine (7) 7H-tetrazolo[1,5-i]purine

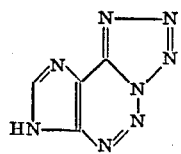

7H-tetrazolo[1,5-i]purine (8) 6H-cyclopenta[e]tetrazolo[1,5-a]pyrimidine

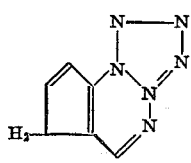

7,8-dihydro-6H-cyclopenta[e]tetrazolo[1,5-a]pyrimidine (9) Tetrazolo[1,5-a]quinazoline

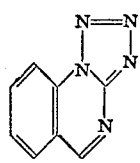

5-chlorotetrazolo[1,5-a]quinazoline
6,7,8,9-tetrahydrotetrazolo[1,5-a]quinazoline
5-chloro-6,7,8,9-tetrahydrotetrazolo[1,5-a]quinazoline
5-hydroxy-6,7,8,9-tetrahydrotetrazolo[1,5-a]quinazoline
5-anilino-6,7,8,9-tetrahydrotetrazolo[1,5-a]quinazoline (C) Tetracyclic tetrazoles (1) Naphtho[2',1':4,5]thiazolo[3,2-d]tetrazole

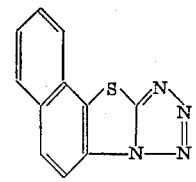

Naphtha[2',1':4,5]thiazolo[3,2-d]tetrazole (2) Tetrazolo[1,5-d]phenanthridine

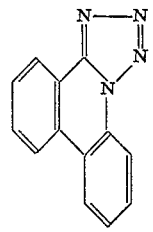

Tetrazolo[1,5-d]phenanthridine (3) Ditetrazolo[1,5-a:5',1'-c]quinoxaline

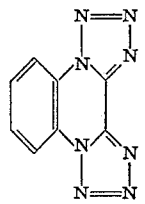

Ditetrazolo[1,5-a:5',1'-c]quinoxaline

In general, the tetrazole starting materials have been made by three methods:

(1) Diazotization of an amino compound and reaction of the diazo with sodium azide.

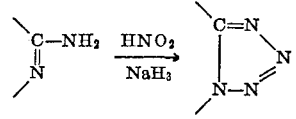

(2) Reaction of a hydrazine with nitrous acid.

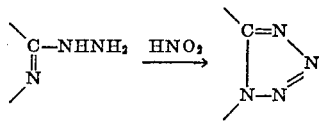

(3) Reaction of a chloro compound with sodium azide.

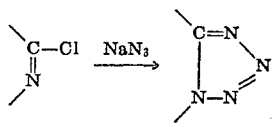

The tertiary phosphines of use in preparing the compounds of this invention include tri(lower)alkylphosphines, such as trimethylphosphine, triethylphosphine, etc.; triarylphosphines having monocyclic and bicyclic aryl groups such as triphenylphosphine, tri-alpha-naphthylphosphine, etc.; and tri[monocyclic ar(lower)]phosphines, such as tribenzylphosphine, etc.

The reaction between the tetrazole and the tertiary phosphine are carried out in an inert organic solvent medium such as acetonitrile, ethyl acetate, DMF, diglyme, dimethylsulfoxide, benzene, nitromethane and 2-methyl-5-ethylpyridine, at a temperature between 25° C. and the reflux temperature of the solvent. The higher temperatures promote more rapid reactions.

The compounds of this invention as defined by Formula III are useful in a conventional manner as fire retardants for synthetic polymeric materials.

EXAMPLE 1

N-(2-benzothiazolyl)-P,P,P-triphenylphosphine imide

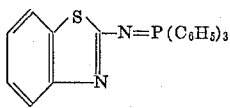

A slurry of 0.88 part (0.005 mole) of tetrazolo-[5,1-b]benzothiazole in 50 parts of benzene was added to a solution of 1.5 parts of triphenylphosphine in about three parts of benzene. The mixture was warmed until a pale yellow solution resulted. Gas was evolved. On cooling, a white precipitate separated which was removed by filtration. Partial evaporation of the filtrate and addition of ligroin resulted in more precipitate. The combined precipitates were recrystallized from methylcyclohexane. The product melted at 163.6–167.0° C. with decomposition.

Substitution of equimolar amounts of trimethylphosphine and tribnezylphosphine for the phosphine of Example 1, gives the corresponding trimethylphosphine imide and tribenzylphosphine imide, respectively.

Substitution of equimolar amounts of thiazolo-[3,2-d]tetrazole, 6-nitrotetrazolo[5,1-b]benzothiazole, tetrazolo-[5,1-b]benzoselenazole and naphtho[2',1':4,5]thiazolo-[3,2-d]tetrazole in the procedure of Example 1, gives N-(2-thiazolyl)-, N-[2-(6-nitrobenzothiazolyl)]-, N-(2-benzoselenazolyl)- and N-(2-naphtho[2,1-d]thiazolyl)-P,P,P-triphenylphosphine imide, respectively.

EXAMPLE 2

N-(4,6-dimethyl-2-pyrimidinyl)-P,P,P-triphenylphosphine imide

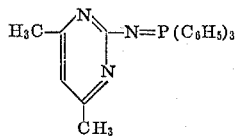

A solution of 1.49 parts (0.01 mole) of 5,7-dimethyltetrazolo[1,5-a]pyrimidine and 2.62 parts (0.01 mole) of triphenylphosphine in about 20 parts of benzene was refluxed for one hour. The benzene was partially removed by evaporation, and the resulting white precipitate was separated by filtration, washed with ligroin and dried. The product (3.56 parts), after recrystallization from benzene, melted at 212.6–213.5° C.

The corresponding P,P,P-tribenzylphosphine imide is obtained by substituting tribenzylphosphine for the phosphine used in Example 1.

The replacement of the pyrimidine derivative used in Example 2, with an equimolar quantity of 5-methyltetrazolopyridine, 6-methoxytetrazolo[1,5-b]pyridazine, tetrazolo-[1,5-a]quinoline or tetrazolo[5,1-a]phthalazine, respectively, gives the following:

N-[2-(5-methylpyridinyl)]-P,P,P-triphenylphosphine imide,
N-[3-(6-methoxypyridizinyl)]-P,P,P-triphenylphosphine imide,
N-(2-quinolinyl)-P,P,P-triphenylphosphine imide,
N-(1-phthalazinyl)-P,P,P-triphenylphosphine imide.

EXAMPLE 3

N-(4-hydroxy-6-methyl-2-pyrimidinyl)-P,P,P-triphenylphosphine imide

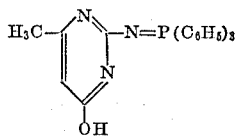

A solution of 0.7 part (0.005 mole) of 5-hydroxy-7-methyltetrazolo[1,5-a]pyrimidine in about 10 parts of 2-methyl-5-ethylpyridine was heated with 1.35 parts (0.005 mole) of triphenylphosphine until complete solution was attained. Gas was evolved. The reaction mixture was cooled and a very small amount of cyclohexane was added. A white precipitate appeared which was separated by filtration, washed with cyclohexane and dried. The product, after recrystallization from 2-methyl-5-ethylpyridine, melted at 265.5–270° C. with decomposition.

Replacement of the pyrimidine starting material in Example 3 with an equimolar quantity of 4H-tetrazolo[5,1-a]-benzimidazole, 6,8-dimethyltetrazolo[1,5-a][1,8]naphthyridine or 7H-tetrazolo[1,5-i]purine, respectively, gives the following:

N-(2-benzimidazolyl)-P,P,P-triphenylphosphine imide,
N-[2-(5,7-dimethyl-1,8-naphthyridinyl)]-P,P,P-triphenylphosphine imide,
N-[6-(9H-purinyl)]-P,P,P-triphenylphosphine imide.

EXAMPLE 4

N-(4-tetrazolo[1,5-a]quinoxalinyl)-P,P,P-triphenylphosphine imide

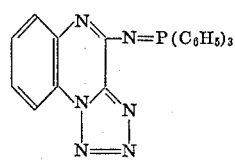

A mixture of 2.12 parts (0.01 mole) of ditetrazolo-[1,5-a:5',1'-c]quinoxaline, 5.35 parts (0.02 mole) of triphenylphosphine and 45 parts of nitromethane was heated to the boiling point. The resulting yellow solution was refluxed for three hours during which time a crystalline precipitate formed. The reaction mixture was cooled, and the precipitate was separated by filtration, washed with ethyl acetate and ligroin and dried. The product (ivory-colored needles) after recrystallization from glycol diacetate, melted at 259–260° C. with decomposition.

The ditetrazolo[1,5-a:5',1'-c]quinoxaline was prepared by reacting 2,3-dichloroquinoxaline with sodium azide by the procedure of Stolle et al., J. Prakt. Chm. 136, 9 (1933). The product was found by I.R. analysis to have the ditetrazolo structure and not the azido-tetrazolo structure as reported by Stolle. The two structures are isomeric.

Replacement of the quinoxaline used in Example 4 with an equimolar quantity of tetrazolo[1,5-d]phenanthridine leads to the product N-(b-phenanthridinyl)-P,P,P-triphenylphosphine imide.

We claim:

1. A compound of the formula:

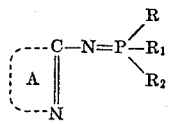

wherein A taken with C=N represents a heterocyclic moiety selected from the group consisting of pyridazinyl, pyrimidinyl, benzothiazolyl, benzoselenazolyl, benzimidazolyl naphthyridinyl, phthalizinyl, purinyl cyclopentapyrimidinyl, quinazolinyl, naphthiazolyl, phenanthridinyl, and quinoxalinyl and R, $R_1$, and $R_2$ are selected from the group consisting of lower alkyl, phenyl, a-naphthyl, and benzyl.

2. The compound N-(2-benzothiazolyl)-P,P,P-triphenylphosphine imide.

3. The compound N-(4,6-dimethyl-2-pyrimidinyl)-P,P,P-triphenylphosphine imide.

4. The compound N-(4-hydroxy-6-methyl-2-pyrimidinyl)-P,P,P-triphenylphosphine imide.

5. A process for the preparation of a compound of claim 1 which comprises reacting a tetrazole of the formula:

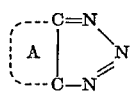

with a phosphine of the formula:

wherein A, R, $R_1$, and $R_2$ are as defined in claim 1, said reaction being conducted in an inert solvent at a temperature between 25° C. and the reflux temperature of the solvent.

6. The process of claim 5 wherein the phosphine is triphenylphosphine.

References Cited

UNITED STATES PATENTS 3,198,796    8/1965    Mosby et al. _____ 260—551

FOREIGN PATENTS 919,868    2/1963    Great Britain.

OTHER REFERENCES

Boyer et al.: Jour. Org. Chem. vol. 25, 1960, pp. 458–459.

Horner et al.: Annalen der Chemie, vol. 627, 1959, pp. 142–143.

Cason: Essential Principles of Organic Chemistry, 1961, p. 443.

William: Detoxification Mechanisms, 1947, p. 194.

NICHOLAS S. RIZZO, *Primary Examiner.*

M. O'BRIEN, R. GALLAGHER, *Assistant Examiners.*

UNITED STATES PATENT OFFICE
CERTIFICATE OF CORRECTION

Patent No. 3,389,137　　　　　　　　　　　　　　　June 18, 1968

William Lindsay Mosby et al.

It is certified that error appears in the above identified patent and that said Letters Patent are hereby corrected as shown below:

Column 2, line 35, "Tetra[1,5-a]pyrimidine" should read -- Tetrazolo[1,5-a]pyrimidine --. Column 3, lines 55 to 60, the formula should appear as shown below:

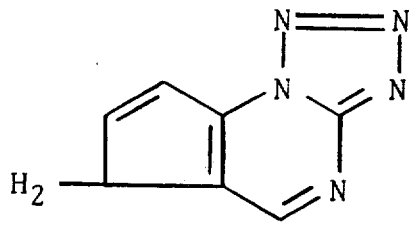

Column 4, line 11, "Naphtha[2′,1′:4,5]thiazolo[3,2-d]tetrazole" should read -- Naphtho[2′,1′:4,5]thiazolo[3,2-d]tetrazole --. Column 6, line 66, "naphthiazolyl" should read -- napthothiazolyl --.

Signed and sealed this 13th day of January 1970.

(SEAL)
Attest:

EDWARD M. FLETCHER, JR.　　　　　　　　　WILLIAM E. SCHUYLER, JR.
Attesting Officer　　　　　　　　　　　　Commissioner of Patents